UNITED STATES PATENT OFFICE.

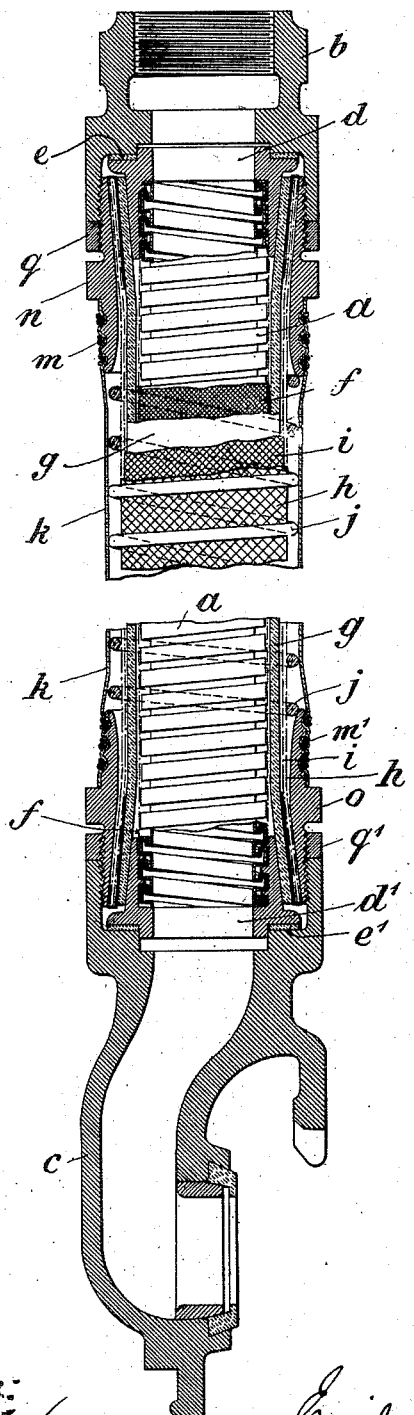

EMIL WITZENMANN, OF PFORZHEIM, GERMANY.

BRAKE-PIPE FOR RAILWAY-CARS.

995,209.

Specification of Letters Patent. Patented June 13, 1911.

Application filed November 10, 1908. Serial No. 461,957.

*To all whom it may concern:*

Be it known that I, EMIL WITZENMANN, a subject of the Grand Duke of Baden, residing at No. 48 Holzgartenstrasse, Pforzheim, German Empire, have invented new and useful Improvements in Brake-Pipes for Railway-Cars, of which the following is a specification.

The subject of my invention is a brake-pipe for railway-cars, constructed of so-called spiral metallic hose of well-known manufacture, that is to say, of a flexible pipe consisting of a metal tape of suitable cross-section wound upon itself. This hose is furnished at the one end, also in well-known manner, with a connecting-piece for joining it to the main pipe, and at the other end with a coupling-piece for attaching it to the second piece of hose.

The essential feature of the invention is that the metallic hose proper is relieved of strain by a second hose of metal gauze or other metallic tape- or wire-fabric, whose ends are soldered or otherwise held to the ends of the principal metallic hose. By this means the cross-section of the passage of the hose is in no wise obstructed, such as is the case with hose hitherto employed, in which the strain on the hose-pipe is taken up by a rope or the like located inside the latter.

A further advantage is that the gauze cover which takes up the strain also acts as armor and prevents injury to the hose.

My invention is illustrated in the accompanying drawing, in which the figure shows a longitudinal section and part elevation of one form of construction of the new hose.

$a$ is the metallic hose, consisting of a metal tape wound upon itself in well-known manner and holding together the connecting-piece $b$ and the coupling-piece $c$. The connecting-piece $b$ and the coupling-piece $c$ each receive a conical terminal-piece $d$, $d^1$, which end-pieces make a tight joint with the parts $b$, $c$ by means of gaskets $e$, $e^1$. The two end-pieces $d$, $d^1$ are provided internally with spiral grooves corresponding with the coils of the hose $a$, whose ends are screwed into said grooves and soldered therein.

Over the hose $a$ there is applied a hose-like cover $f$ of metal-tape or wire, whose extremities, before the hose $a$ is connected with the conical end-pieces $d$, $d^1$, are soldered or otherwise joined to the ends of the hose, so that the amount of longitudinal extension of the hose $a$ is limited by the cover $f$. The cover $f$, in the particular constructional form shown in the drawing, is sheathed with a rubber pipe $g$, the ends of which extend over the conical walls of the terminal-pieces $d$, $d^1$. This rubber pipe $g$, again, is enveloped by a double protective sheathing $h$ $i$, which serves to protect the rubber pipe from injury. The woven or plaited sheathing $h$ $i$ is itself armored with spirally coiled wire $j$, which affords additional protection to the inclosed hose. Finally, there is an outer hose-jacket $k$ of stout fabric provided, whose ends are secured to sleeves $n$, $o$ respectively by binding-wires $m$ $m^1$. These sleeves $n$, $o$ present an external thread and screw into a corresponding internal thread on the connecting-piece $b$ and coupling-piece $c$ respectively. In order to render the connection of the parts $n$ $b$ and $o$ $c$ more secure, lock-nuts $q$ $q^1$ are provided, and are only tightened up when the ends of the hose $g$ $h$ $i$ have been forced against the conical walls of the end-pieces $d$ $d^1$ by the sleeves $o$ $n$ being screwed tight into the parts $b$ $c$.

The inner metallic hose $a$ can naturally be covered or armored in other manner than that above described, without departure from the characteristic feature of my invention, which is that the metallic hose $a$ is relieved of strain by an enveloping metal fabric cover $f$, whereby the advantages already referred to are secured.

Having thus described my invention, I declare that what I claim as new and desire to secure by Letters Patent is:—

1. A relieving brake pipe for railway cars comprising, in combination, a metal spiral hose, a connecting piece for one end thereof, a coupling-piece for the other end thereof and a metallic fabric cover which surrounds the metal spiral hose and has its ends connected by soldering with the ends of the metal spiral hose so that the extension of the latter longitudinally is limited by the metal fabric cover and the metal spiral hose relieved of strain.

2. A relieving brake pipe for railway cars comprising a metal spiral hose, a connecting piece for one end thereof, a coupling piece for the other end thereof both being conical, a metallic fabric cover surrounding said metal spiral hose with its ends connected by solder directly with the ends of the metal spiral hose, and an outer sheath for said hose and fabric cover having its ends engaged by the connecting piece and coupling piece.

In witness whereof I have hereunto signed my name this 21. day of October 1908, in the presence of two subscribing witnesses:

EMIL WITZENMANN.

Witnesses:
  HERMANN PLISDELSE,
  OTTO SCHROEDER.